United States Patent
Johnson

(10) Patent No.: US 11,237,904 B2
(45) Date of Patent: *Feb. 1, 2022

(54) TRACKING DATA ACCESS IN A DISPERSED STORAGE NETWORK

(71) Applicant: International Business Machines Corporation, Armonk, NY (US)

(72) Inventor: Trent William Johnson, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 58 days.

This patent is subject to a terminal disclaimer.

(21) Appl. No.: 16/050,533

(22) Filed: Jul. 31, 2018

(65) Prior Publication Data

US 2018/0336099 A1 Nov. 22, 2018

Related U.S. Application Data

(63) Continuation of application No. 15/210,209, filed on Jul. 14, 2016, now Pat. No. 10,114,696.

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
None
See application file for complete search history.

(56) References Cited

U.S. PATENT DOCUMENTS

| 4,092,732 | A | * | 5/1978 | Ouchi | G06F 11/1076 714/5.11 |
| 4,730,320 | A | * | 3/1988 | Hidaka | G06F 11/1008 714/766 |
| 5,454,101 | A | * | 9/1995 | Mackay | G06F 16/9017 |
| 5,485,474 | A | | 1/1996 | Rabin | |
| 5,522,044 | A | | 5/1996 | Pascucci et al. | |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Phung M Chung
(74) *Attorney, Agent, or Firm* — Anthony England; Andrew D. Wright; Roberts Calderon Safran & Cole, P.C.

(57) ABSTRACT

A method for execution by a dispersed storage and task (DST) processing unit that includes a processor includes receiving an access request from a requesting entity via a network indicating an original data object. At least one read request is generated for transmission to at least one storage unit indicating a plurality of encoded original data slices associated with the original data object. A regenerated original data object is generated by utilizing a decoding scheme on the plurality of encoded original data slice. A transformed data object is generated for transmission to the requesting entity via the network by utilizing a transformation function on the first regenerated original data object based on an entity identifier associated with the requesting entity.

20 Claims, 6 Drawing Sheets

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,886,654 A | 3/1999 | Ichikawa et al. | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,954,787 B2* | 2/2015 | Gladwin | G06F 11/1092 714/4.2 |
| 9,380,032 B2 | 6/2016 | Resch et al. | |
| 9,501,360 B2 | 11/2016 | Trichardt et al. | |
| 9,749,414 B2 | 8/2017 | Resch | |
| 10,114,696 B2 | 10/2018 | Johnson | |
| 10,225,271 B2* | 3/2019 | Motwani | H04L 63/1416 |
| 10,298,683 B2* | 5/2019 | Litvinsky | G06F 11/1092 |
| 10,334,045 B2* | 6/2019 | Wozniak | H04L 49/901 |
| 10,389,814 B2* | 8/2019 | Cocagne | H04L 67/1097 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0209304 A1* | 8/2008 | Winarski | G06F 11/1088 714/763 |
| 2009/0094251 A1 | 4/2009 | Gladwin et al. | |
| 2009/0094318 A1 | 4/2009 | Gladwin et al. | |
| 2009/0157741 A1* | 6/2009 | Cheng | G06F 9/543 |
| 2009/0319863 A1 | 12/2009 | Shirai | |
| 2010/0023524 A1 | 1/2010 | Gladwin et al. | |
| 2013/0061115 A1 | 3/2013 | Imai et al. | |
| 2019/0166197 A1* | 5/2019 | Litvinsky | H03M 13/3761 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

List of IBM Patents or Patent Applications Treated as Related, dated Feb. 27, 2020, 1 page.

\* cited by examiner

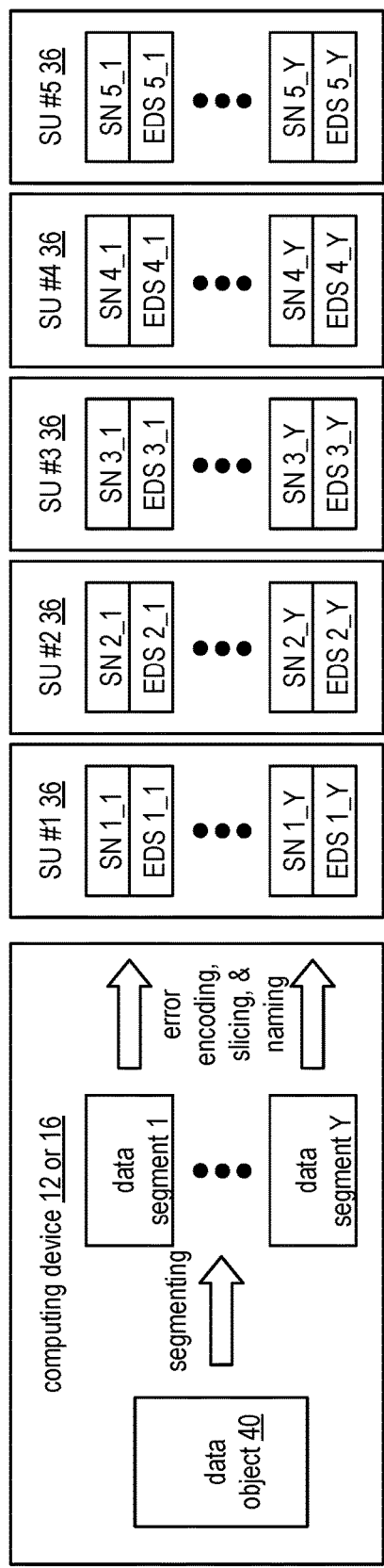
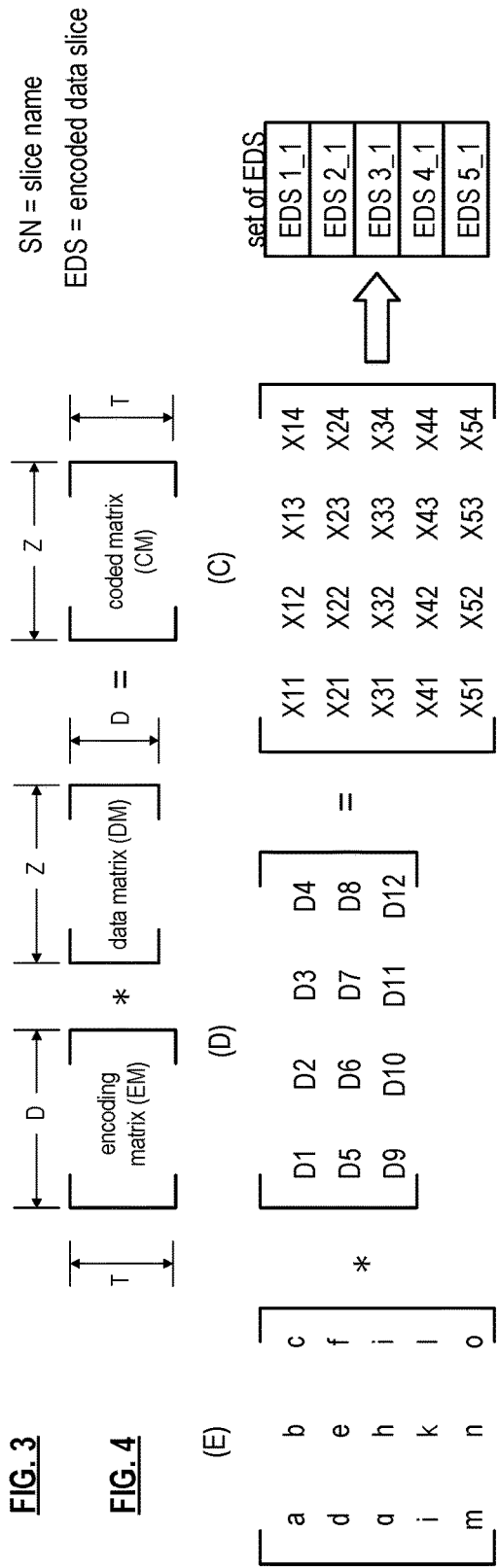
FIG. 3
FIG. 4
FIG. 5
FIG. 6

TRACKING DATA ACCESS IN A DISPERSED STORAGE NETWORK

CROSS REFERENCE TO RELATED APPLICATIONS

The present U.S. Utility patent application claims priority pursuant to 35 U.S.C. § 120 as a continuation of U.S. Utility application Ser. No. 15/210,209, entitled "TRACKING DATA ACCESS IN A DISPERSED STORAGE NETWORK", filed Jul. 14, 2016, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
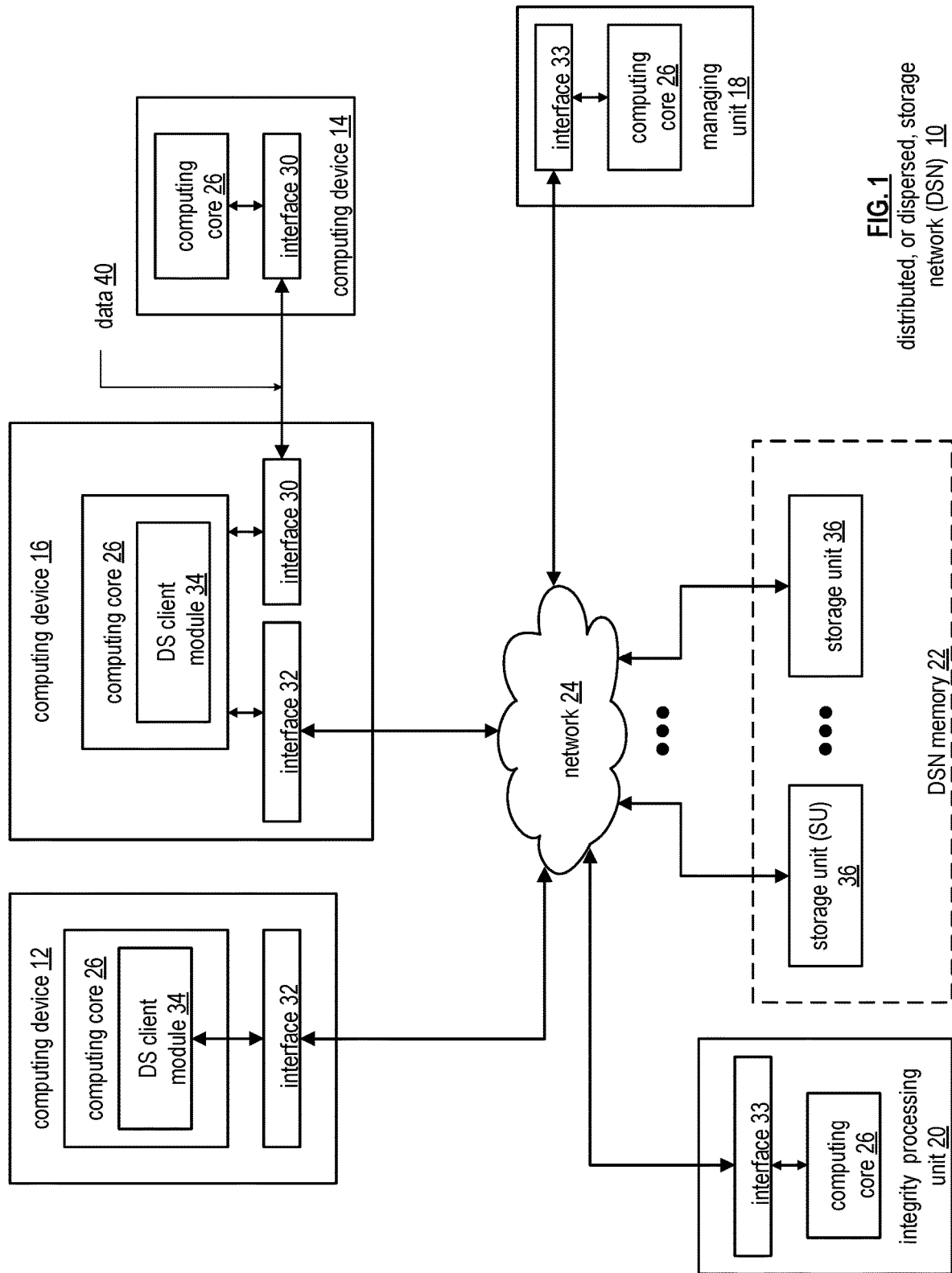
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
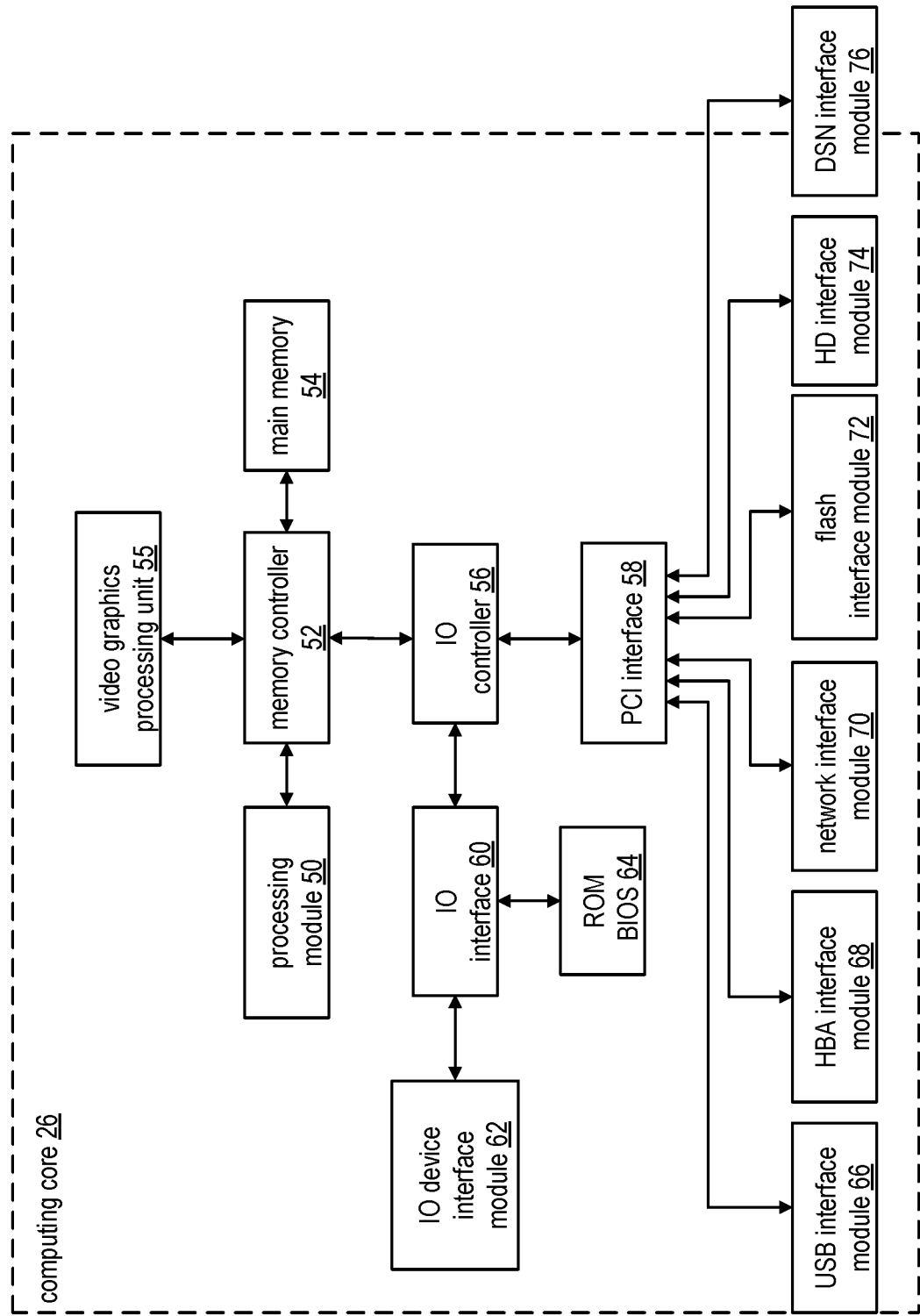
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voiceto-text conversion, etc.), multiple simple and/or complex functions, one or more algorithms, one or more applications, etc. Hereafter, a storage unit may be interchangeably referred to as a DST execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
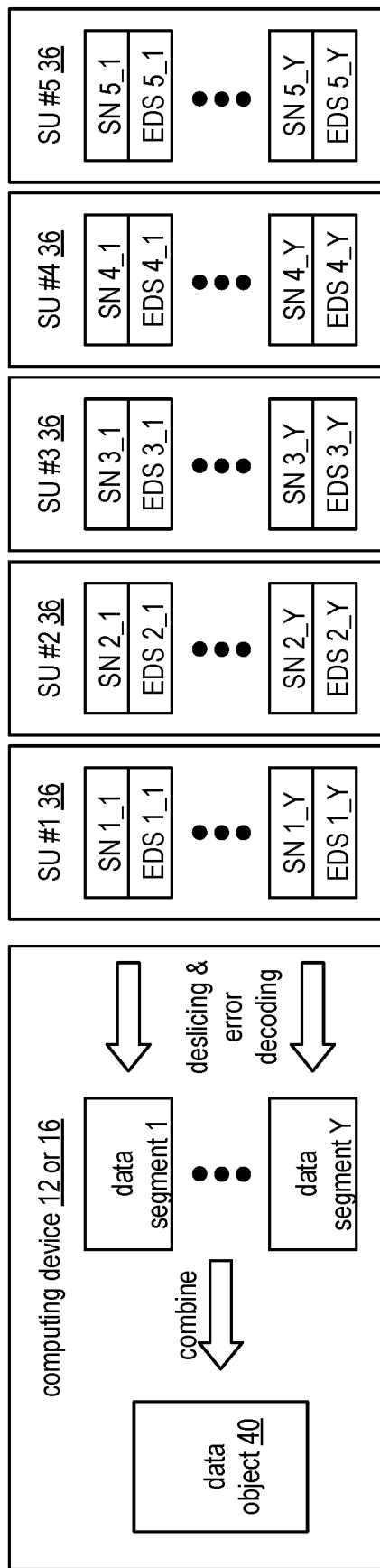
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
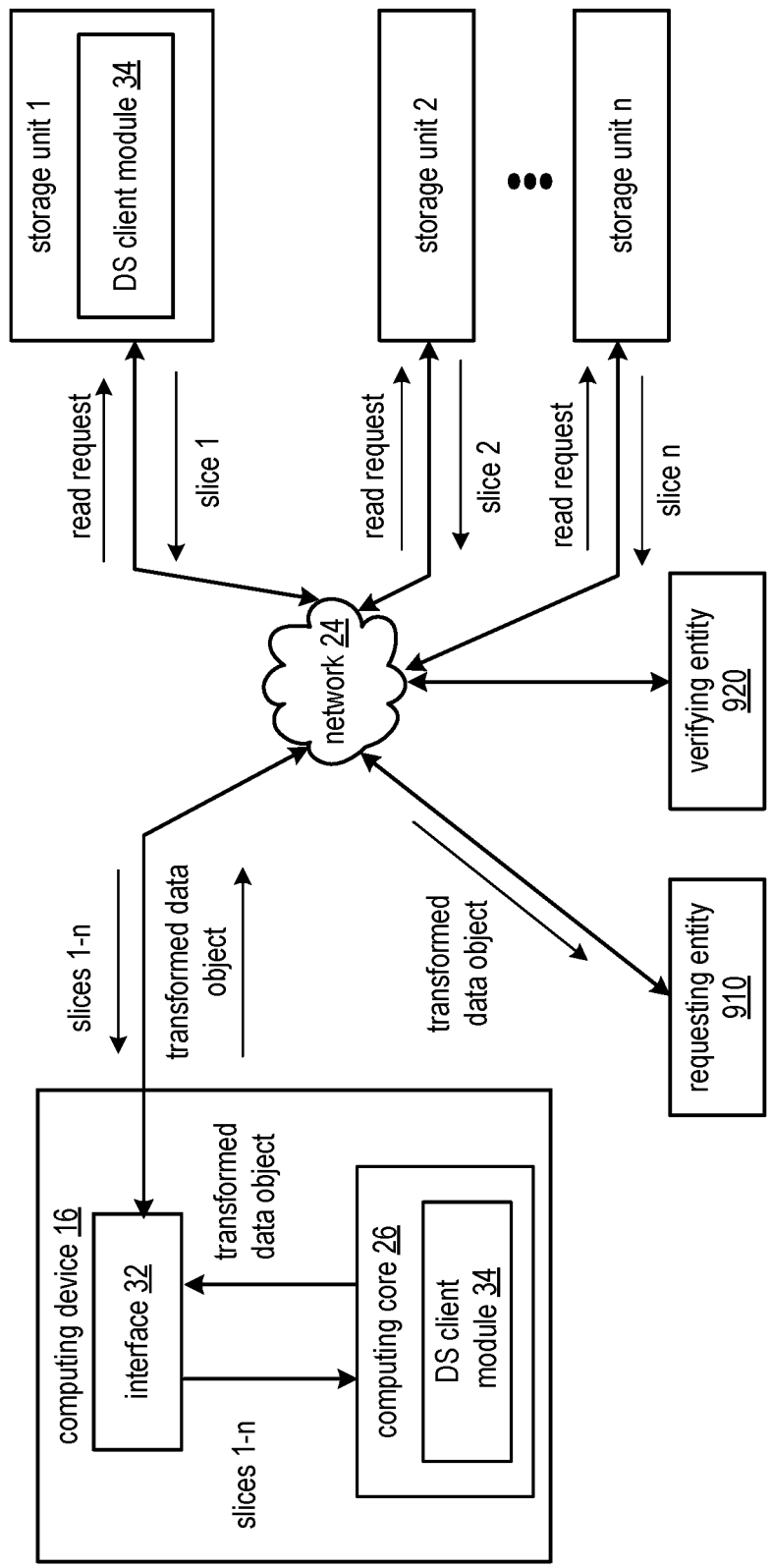
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a computing device 16 of FIG. 1, the network 24 of FIG. 1, a requesting entity 910, a verifying entity 920, and a plurality of storage units 1-n. Each computing device 16 can include the interface 32 of FIG. 1, the computing core 26 of FIG. 1, and the DS client module 34 of FIG. 1. The computing device 16 can function as a dispersed storage processing agent for computing device 14 as described previously, and may hereafter be referred to as a distributed storage and task (DST) processing unit. Each storage unit can include DS client module 34 and may be implemented utilizing the storage unit 36 of FIG. 1. The requesting entity 910 and/or verifying entity 920 may be implemented utilizing computing devices 12-16 of FIG. 1. The DSN functions to track data access.

In the case where sensitive information is communicated to a trusted set of entities and accountability for keeping information confidential is critical, the distributor of such information may desire the ability to identify the entity who leaked information in the event of a security breach or data exposure. To achieve this, content is stored in a DSN memory. To enable accountability for this content, a unique transformation is applied to data object upon access by an entity to track that the entity accessed the content. For example, a requesting entity can request access to a data object stored in a DSN via a computing device 12-16. The DST processing unit, upon receiving the request indicating the data object, can retrieve the data object by retrieving a decode threshold number of encoded data slices associated with the data object from at least one storage unit of the DSN, and applying the appropriate decoding function according to the dispersed error encoding scheme used. After recovering the data object, the DST processing unit can apply a transformation function to the data object based on an identifier associated with the requesting entity. The transformed data object is returned to the requesting entity, and contains a unique signature indicating that the data object has been accessed by the requesting entity.

In various embodiments, the transformed data object is also stored in the DSN. For example, the DST processing unit can generate dispersed error encoded slices corresponding to the transformed object to be written to at least one storage unit. In various embodiments, the DST processing unit can also request that the original data object be removed from storage, or be replaced by the slices corresponding to the transformed data object.

In various embodiments, the transformation function applies randomized or pseudorandomized changes to the underlying stored content of the data object. In particular, in the case of content that can be lossily encoded (such as a picture, sound file, video stream, document, etc.), imperceptible changes can be applied that are indistinguishable to the human senses. Furthermore, in various embodiments, the changes introduced by the transformation function are great enough that they would survive in any other copy of the content. For example, in the case of an image or video file, may insert small pixel artifacts, in the case of a sound file, sub-audible tweaks may be embedded in the sound, in the case of a document, subtle differences in spacing, punctuation, type-face, etc. may be applied. These changes, when compared to the original, will represent a unique signature or "water mark" for whichever entity accessed the data. In various embodiments, other information regarding the access, such as a time stamp, access location, and/or changes applied by the entity can also be included in the unique signature. In various embodiments, the transformation function is non-reversible, and the unique signature can only be recovered if the original data object is available. For example, a comparison function, when applied to both the original data object and the transformed data object, can be used to recover the unique signature and thus determine the access history of the data object.

In various embodiments, a verifying unit can compare an original data object and a transformed data object to determine one or more requesting entities that accessed the content. For example, a verifying unit can send an access history request to the DST processing unit that indicates or includes the data object. For example, the original data object and/or the transformed data object can be included in the access history request itself. In other embodiments, the original data object and/or transformed data object can be indicated in the request with an identifier, and can be retrieved from storage by the DST processing unit. In various embodiments, the DST processing unit can return a stored, transformed data object for comparison by the verifying entity itself. In other embodiments, the DST processing unit can perform the comparison function itself on the original data object and the transformed data object, and can return the access history indicated by the output of the function to the requesting entity.

In various embodiments, a requesting entity can request write a data object to storage. The DST processing unit, upon receiving the data object, can perform the transformation function before storing the data object. In various embodiments, the DST processing unit will write both the original data object and transformed data object to storage, for example, for ease of comparison in the future. A verifying entity can retrieve the access history as usual and determine the data object was written by the requesting entity. In various embodiments, the access history indicated in the unique signature will indicate that the data object was written by the requesting entity, while other unique signatures will indicate that a data object was merely read by a requesting entity.

In various embodiments, a data object can be accessed by multiple entities, and the access by multiple entities can be tracked via the unique signature. For example, after a first entity accesses a data object, the data object will be transformed based on an identifier associated with the first entity, and the transformed data object can be returned to the first accessing entity and can replace the original data object in storage. When a second entity requests the data object, the transformation function will be applied to the already transformed data object, this time based on an identifier of the second entity. The transformed data object will now reflect the access history by both the first entity and the second entity, for example, when compared to the original data object.

In various embodiments, a processing system of a dispersed storage and task (DST) processing unit includes at least one processor and a memory that stores operational instructions, that when executed by the at least one processor cause the processing system to receive an access request from a first requesting entity via a network indicating a first original data object. A first at least one read request is generated for transmission to at least one storage unit indicating a plurality of encoded original data slices associated with the first original data object. A first regenerated original data object is generated by utilizing a decoding scheme on the plurality of encoded original data slices. A first transformed data object is generated for transmission to the first requesting entity via the network by utilizing a transformation function on the first regenerated original data object based on a first entity identifier associated with the first requesting entity.

In various embodiments, the transformation function includes inserting randomized and/or pseudorandomized changes to content of the first original data object. In various embodiments, the transformation function is a one-way function. In various embodiments, the first transformed data object includes new content that is generated by applying imperceptible changes to content of the first original data object, i.e. where the new content of the first transformed data object is indistinguishable from the content of the first original data object by human senses. In various embodiments, the first original data object includes at least one of: image file content or video file content, and where generating the first transformed data object includes applying changes to at least one pixel of the at least one of: the image file content or the video file content. In various embodiments, the first original data object includes sound file content, and where generating the first transformed data object includes applying audible changes to the sound file content. In various embodiments, the first original data object includes document file content, and where generating the first transformed data object includes applying changes to at least one of: spacing, punctuation, or type-face of the document file content.

In various embodiments, an access history request is received from a verifying entity via the network that indicates the first original data object and includes the first transformed data object. A second at least one read request is generated for transmission to at least one storage unit indicating the plurality of encoded original data slices associated with the first original data object. A second regenerated data object is generated by utilizing the decoding scheme on the plurality of encoded original data slices. Access history data is generated based on comparing the first transformed data object received from the verifying entity to the second regenerated data object, where the access history data indicates the first entity identifier associated with the first requesting entity. The first entity identifier is transmitted to the verifying entity via the network.

In various embodiments, a plurality of encoded transformed data slices are generated by applying an encoding scheme to the first transformed data object. A plurality of write requests are generated for transmission to a first plurality of storage units via the network, where each of the plurality of write requests includes at least one of the plurality of encoded transformed data slices for storage. In various embodiments, a plurality of delete requests corresponding to each of the plurality of encoded original data slices associated with the first original data object are generated for transmission to a second plurality of storage units via the network, where each of the plurality of delete requests indicate one of the plurality of encoded original data slices for removal from a corresponding one of the second plurality of storage units. In various embodiments, each of the plurality of write requests includes a request to replace one of the plurality of encoded original data slices with a one of the plurality of encoded transformed data slices. In various embodiments, an access history request is received from a verifying entity via the network that indicates the first original data object. A second at least one read request is generated for transmission to at least one of the first plurality of storage units indicating the plurality of encoded transformed data slices associated with the first transformed data object. A regenerated transformed data object is generated by utilizing the decoding scheme on the plurality of encoded transformed data slices. Access history data is generated based on comparing the first original data object to the regenerated transformed data object, where the access history data indicates the first entity identifier associated with the first requesting entity. The first entity identifier is transmitted to the verifying entity via the network.

In various embodiments, a second original data object is received from a second requesting entity for storage. A second transformed data object is generated by utilizing the transformation function on the second original data object based on a second entity identifier associated with the second requesting entity. A plurality of encoded transformed data slices are generated by applying an encoding scheme to the second transformed data object. A plurality of write requests are generated for transmission to a plurality of storage units via the network, where each of the plurality of write requests includes at least one of the plurality of encoded transformed data slices for storage.

Figure 10:
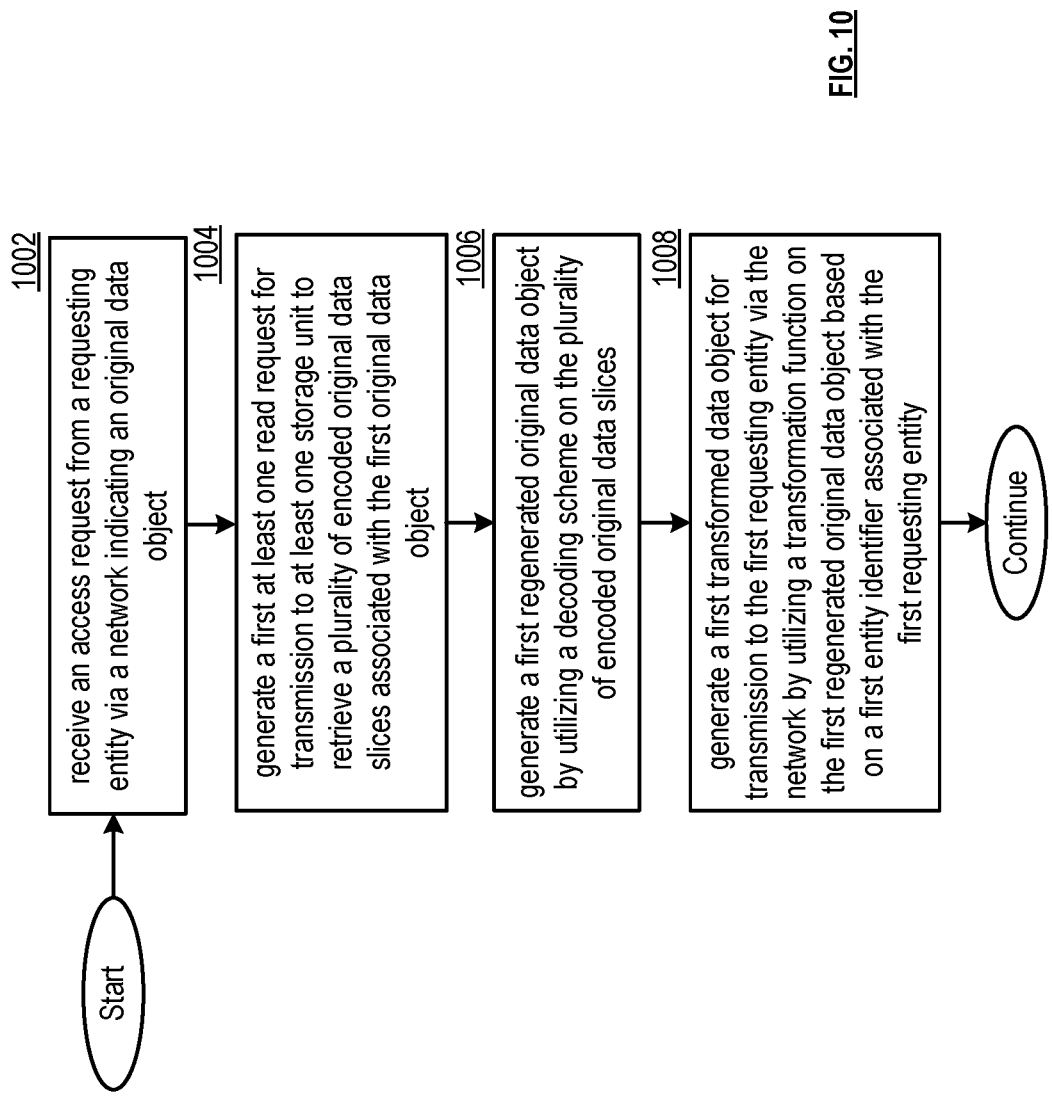
FIG. 10 is a logic diagram of an example of a method of tracking data access in accordance with the present invention.

FIG. 10 is a flowchart illustrating an example of tracking data access. In particular, a method is presented for use in conjunction with one or more functions and features described in association with FIGS. 1-9, for execution by a dispersed storage and task (DST) processing unit that includes a processor or via another processing system of a dispersed storage network that includes at least one processor and memory that stores instruction that configure the processor or processors to perform the steps described below. Step 1002 includes receiving an access request from a requesting entity via a network indicating an original data object. Step 1004 includes generating a first at least one read request for transmission to at least one storage unit indicating a plurality of encoded original data slices associated with the first original data object. Step 1006 includes generating a first regenerated original data object by utilizing a decoding scheme on the plurality of encoded original data slices. Step 1008 includes generating a first transformed data object for transmission to the first requesting entity via the network by utilizing a transformation function on the first regenerated original data object based on a first entity identifier associated with the first requesting entity.

In various embodiments, the transformation function includes inserting randomized and/or pseudorandomized changes to content of the first original data object. In various embodiments, the transformation function is a one-way function. In various embodiments, the first transformed data object includes new content that is generated by applying imperceptible changes to content of the first original data object, i.e. where the new content of the first transformed data object is indistinguishable from the content of the first original data object by human senses. In various embodiments, the first original data object includes at least one of: image file content or video file content, and where generating the first transformed data object includes applying changes to at least one pixel of the at least one of: the image file content or the video file content. In various embodiments, the first original data object includes sound file content, and where generating the first transformed data object includes applying audible changes to the sound file content. In various embodiments, the first original data object includes document file content, and where generating the first transformed data object includes applying changes to at least one of: spacing, punctuation, or type-face of the document file content.

In various embodiments, an access history request is received from a verifying entity via the network that indicates the first original data object and includes the first transformed data object. A second at least one read request is generated for transmission to at least one storage unit indicating the plurality of encoded original data slices associated with the first original data object. A second regenerated data object is generated by utilizing the decoding scheme on the plurality of encoded original data slices. Access history data is generated based on comparing the first transformed data object received from the verifying entity to the second regenerated data object, where the access history data indicates the first entity identifier associated with the first requesting entity. The first entity identifier is transmitted to the verifying entity via the network.

In various embodiments, a plurality of encoded transformed data slices are generated by applying an encoding scheme to the first transformed data object. A plurality of write requests are generated for transmission to a first plurality of storage units via the network, where each of the plurality of write requests includes at least one of the plurality of encoded transformed data slices for storage. In various embodiments, a plurality of delete requests corresponding to each of the plurality of encoded original data slices associated with the first original data object are generated for transmission to a second plurality of storage units via the network, where each of the plurality of delete requests indicate one of the plurality of encoded original data slices for removal from a corresponding one of the second plurality of storage units. In various embodiments, each of the plurality of write requests includes a request to replace one of the plurality of encoded original data slices with a one of the plurality of encoded transformed data slices. In various embodiments, an access history request is received from a verifying entity via the network that indicates the first original data object. A second at least one read request is generated for transmission to at least one of the first plurality of storage units indicating the plurality of encoded transformed data slices associated with the first transformed data object. A regenerated transformed data object is generated by utilizing the decoding scheme on the plurality of encoded transformed data slices. Access history data is generated based on comparing the first original data object to the regenerated transformed data object, where the access history data indicates the first entity identifier associated with the first requesting entity. The first entity identifier is transmitted to the verifying entity via the network.

In various embodiments, a second original data object is received from a second requesting entity for storage. A second transformed data object is generated by utilizing the transformation function on the second original data object based on a second entity identifier associated with the second requesting entity. A plurality of encoded transformed data slices are generated by applying an encoding scheme to the second transformed data object. A plurality of write requests are generated for transmission to a plurality of storage units via the network, where each of the plurality of write requests includes at least one of the plurality of encoded transformed data slices for storage.

In various embodiments, a non-transitory computer readable storage medium includes at least one memory section that stores operational instructions that, when executed by a processing system of a dispersed storage network (DSN) that includes a processor and a memory, causes the processing system to receiving an access request from a first requesting entity via a network indicating a first original data object. A first at least one read request is generated for transmission to at least one storage unit indicating a plurality of encoded original data slices associated with the first original data object. A first regenerated original data object is generated by utilizing a decoding scheme on the plurality of encoded original data slices. A first transformed data object is generated for transmission to the first requesting entity via the network by utilizing a transformation function on the first regenerated original data object based on a first entity identifier associated with the first requesting entity.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure)

or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprises:
   receiving an access request from a first requesting entity via a network indicating a first original data object;
   generating a first at least one read request for transmission to at least one storage unit to retrieve a plurality of encoded original data slices associated with the first original data object, wherein the plurality of encoded original data slices are generated using a dispersed storage error encoding process;
   generating a first regenerated original data object by utilizing a decoding scheme on the plurality of encoded original data slices; and
   generating a first transformed data object for transmission to the first requesting entity via the network, wherein the first transformed data object is generated by applying changes to content of the first regenerated original data object.

2. The method of claim 1, wherein the generating the first transformed data object comprises inserting one of: randomized or pseudorandomized changes to the content of the first regenerated original data object.

3. The method of claim 1, wherein the first transformed data object is generated by applying imperceptible changes to the content of the first regenerated original data object.

4. The method of claim 1, wherein the content includes at least one of: image file content or video file content, and wherein generating the first transformed data object includes applying changes to at least one pixel of the at least one of: the image file content or the video file content.

5. The method of claim 1, wherein the content includes sound file content, and wherein generating the first transformed data object includes applying audible changes to the sound file content.

6. The method of claim 1, wherein the content includes document file content, and wherein generating the first transformed data object includes applying changes to at least one of: spacing, punctuation, or type-face of the document file content.

7. The method of claim 1, further comprising:
receiving an access history request from a verifying entity via the network that indicates the first original data object and includes the first transformed data object;
generating a second at least one read request for transmission to at least one storage unit indicating the plurality of encoded original data slices associated with the first original data object;
generating a second regenerated data object by utilizing the decoding scheme on the plurality of encoded original data slices;
generating access history data based on comparing the first transformed data object received from the verifying entity to the second regenerated data object, wherein the access history data indicates the first entity identifier associated with the first requesting entity; and
transmitting the first entity identifier to the verifying entity via the network.

8. The method of claim 1, further comprising:
generating a plurality of encoded transformed data slices by applying an encoding scheme to the first transformed data object; and
generating a plurality of write requests for transmission to a first plurality of storage units via the network, wherein each of the plurality of write requests includes at least one of the plurality of encoded transformed data slices for storage.

9. The method of claim 8, further comprising generating a plurality of delete requests corresponding to each of the plurality of encoded original data slices associated with the first original data object for transmission to a second plurality of storage units via the network, wherein each of the plurality of delete requests indicate one of the plurality of encoded original data slices for removal from a corresponding one of the second plurality of storage units.

10. The method of claim 8, wherein each of the plurality of write requests includes a request to replace one of the plurality of encoded original data slices with a one of the plurality of encoded transformed data slices.

11. The method of claim 8, further comprising:
receiving an access history request from a verifying entity via the network that indicates the first original data object;
generating a second at least one read request for transmission to at least one of the first plurality of storage units indicating the plurality of encoded transformed data slices associated with the first transformed data object;
generating a regenerated transformed data object by utilizing the decoding scheme on the plurality of encoded transformed data slices;
generating access history data based on comparing the first original data object to the regenerated transformed data object, wherein the access history data indicates the first entity identifier associated with the first requesting entity; and
transmitting the first entity identifier to the verifying entity via the network.

12. The method of claim 1, further comprising:
receiving a second original data object from a second requesting entity for storage;
generating a second transformed data object by utilizing the transformation function on the second original data object based on a second entity identifier associated with the second requesting entity;
generating a plurality of encoded transformed data slices by applying an encoding scheme to the second transformed data object; and
generating a plurality of write requests for transmission to a plurality of storage units via the network, wherein each of the plurality of write requests includes at least one of the plurality of encoded transformed data slices for storage.

13. A processing system of a dispersed storage and task (DST) processing unit comprises:
at least one processor;
a memory that stores operational instructions, that when executed by the at least one processor cause the processing system to:
generate, in response to a first requesting entity requesting access to a first original data object, a first regenerated original data object by utilizing a decoding scheme on a plurality of encoded original data slices associated with the first original data object, wherein the plurality of encoded original data slices are generated using a dispersed storage error encoding process;
generate a first transformed data object by utilizing a transformation function on the first regenerated original data object based on a first entity identifier associated with the first requesting entity; and
transmit the first transformed data object to the first requesting entity.

14. The processing system of claim 13, wherein the generating the first transformed data object comprises inserting one of: randomized or pseudorandomized changes to content of the first original data object.

15. The processing system of claim 13, wherein the operational instructions, when executed by the at least one processor, further cause the processing system to:
receive an access history request from a verifying entity via the network that indicates the first original data object and includes the first transformed data object;
generate a second at least one read request for transmission to at least one storage unit indicating the plurality of encoded original data slices associated with the first original data object;
generate a second regenerated data object by utilizing the decoding scheme on the plurality of encoded original data slices;
generate access history data based on comparing the first transformed data object received from the verifying entity to the second regenerated data object, wherein the access history data indicates the first entity identifier associated with the first requesting entity; and transmit the first entity identifier to the verifying entity via the network.

16. The processing system of claim 13, wherein the operational instructions, when executed by the at least one processor, further cause the processing system to:
generate a plurality of encoded transformed data slices by applying an encoding scheme to the first transformed data object; and
generate a plurality of write requests for transmission to a first plurality of storage units via the network, wherein each of the plurality of write requests includes at least one of the plurality of encoded transformed data slices for storage.

17. The processing system of claim 16, wherein the operational instructions, when executed by the at least one processor, further cause the processing system to:
receive an access history request from a verifying entity via the network that indicates the first original data object;
generate a second at least one read request for transmission to at least one of the first plurality of storage units indicating the plurality of encoded transformed data slices associated with the first transformed data object;
generate a regenerated transformed data object by utilizing the decoding scheme on the plurality of encoded transformed data slices;
generate access history data based on comparing the first original data object to the regenerated transformed data object, wherein the access history data indicates the first entity identifier associated with the first requesting entity; and
transmit the first entity identifier to the verifying entity via the network.

18. The processing system of claim 13, wherein the operational instructions, when executed by the at least one processor, further cause the processing system to:
receive a second original data object from a second requesting entity for storage;
generate a second transformed data object by utilizing the transformation function on the second original data object based on a second entity identifier associated with the second requesting entity;
generate a plurality of encoded transformed data slices by applying an encoding scheme to the second transformed data object; and
generate a plurality of write requests for transmission to a plurality of storage units via the network, wherein each of the plurality of write requests includes at least one of the plurality of encoded transformed data slices for storage.

19. A non-transitory computer readable storage medium comprises:
at least one memory section that stores operational instructions that, when executed by a processing system of a dispersed storage network (DSN) that includes a processor and a memory, causes the processing system to:
generate, in response to a first requesting entity requesting access to a first original data object, a first regenerated original data object by utilizing a decoding scheme on a plurality of encoded original data slices associated with the first original data object, wherein the plurality of encoded original data slices are generated using a dispersed storage error encoding process; and
generate a first transformed data object by utilizing a transformation function on the first regenerated original data object based on a first entity identifier associated with the first requesting entity; and
transmit the first transformed data object to the first requesting entity.

20. The method of claim 1, further comprising transmitting the first transformed data object to the first requesting entity.

* * * * *